April 9, 1935.                    E. H. HAND                   1,997,417
                ELECTRICALLY OPERATED HEIGHT MEASURING DEVICE
                          Filed June 3, 1933

INVENTOR
ERLE H. HAND
BY
ATTORNEY

Patented Apr. 9, 1935

1,997,417

UNITED STATES PATENT OFFICE 1,997,417

ELECTRICALLY OPERATED HEIGHT MEASURING DEVICE

Erle H. Hand, New York, N. Y.

Application June 3, 1933, Serial No. 674,132

9 Claims. (Cl. 33—125)

This invention relates to new and useful improvements in height measuring devices.

The invention has for an object the construction of a device as mentioned which is characterized by the provision of opposed casing sections spaced to allow a person to stand in between, a mirror mounted upon one of the sections, a tube type of lamp mounted upon the other of the sections opposed to the mirror, and a scale associated with the mirror to give the height of a person standing between the sections and looking into said mirror at the point where the top of the head cuts off the reflection of the tube type of light.

The invention has for a still further object the arrangement of the parts in such a manner that any error in height due to variation of different people of the distances between the eyes and the top of the head, is reduced so as to be negligible.

Still further the invention contemplates arranging the opposed casing sections spaced from each other a sufficient distance with relation to the distance of a person's eyes to the tube type of light so as to reduce the error mentioned in the previous paragraph. Furthermore it is proposed to arrange foot projections upon the device to instruct a person where to stand so that the error is reduced as mentioned.

Still further the invention contemplates the provision of a novel scale in conjunction with the measuring device so that the person may easily read the height.

Still further an arrangement is proposed whereby the mirror is normally hid by shutters arranged to automatically open when the device is set into operation.

Still further an arrangement is proposed whereby the mirror and tube type of lamp are disposed behind glass panes arranged on the casing sections.

As another object of this invention, an arrangement is proposed whereby upon the insertion of a coin or upon the operation of a switch depending upon the design of the device, a means is caused to function for illuminating the tube type of lamp and for operating the shutters.

Still further a novel arrangement is proposed whereby the device is caused to be inoperative immediately upon the person standing between the casing sections moving from this position. In detail, it is proposed to provide a beam of light shining directly across the casing sections and coacting with a photo-electric cell arranged in a circuit adapted to cut off the operation of the device when the beam of light is prevented striking the photo-electric cell.

Still further the invention contemplates the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 3:
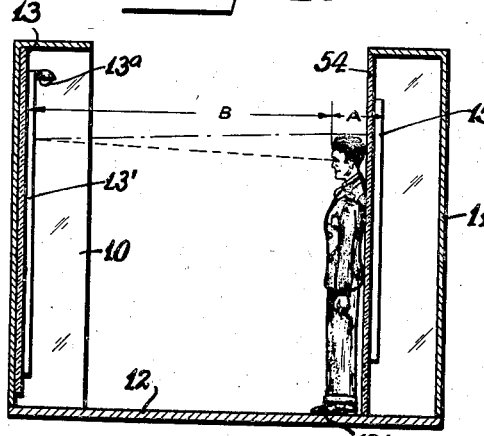
Fig. 3 is a vertical sectional view taken on the line 3—3 of Fig. 2.
Figure 7:
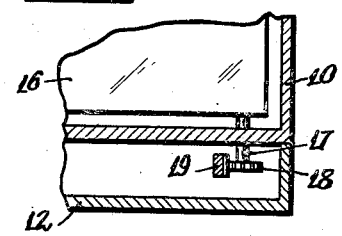
Fig. 7 is a fragmentary vertical sectional view taken on the line 7—7 of Fig. 6.

The height measuring device according to this invention comprises opposed casing sections 10 and 11 held in spaced relation by a base 12. The casing 10 is hollow and open at the front and a reflector or mirror 13 is mounted therein so as to reflect the vision of a person standing upon the base 12 and looking therein. The casing section 11 is also hollow but has its front end closed by a transparent member 14. A mercury vapor or neon or tube type of lamp 15 is mounted immediately behind the transparent material 14. A pair of foot pieces 12' are arranged upon the base 12 so as to guide a person in standing at the proper position when being measured. In Fig. 3 a person is illustrated standing in a position to obtain his measurement.

Figure 4:
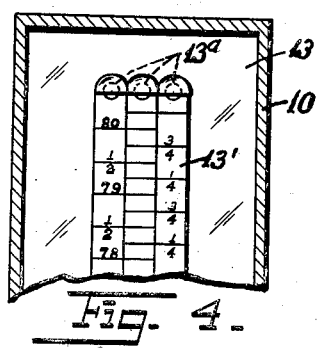
Fig. 4 is a fragmentary vertical sectional view taken on the line 4—4 of Fig. 2.

Associated with the reflecting surface 13 there is a scale 13' shown in Fig. 4 comprising several columns arranged so that it may be read quite easily. The column to the left is divided into inches and half inches. The center column, spaced with lines ¼ inch apart and the column to the right is divided into quarter and three quarter inch spaces. This scale is adapted to be illuminated by the provision of lamps 13ª mounted upon the ends thereof and adapted to throw beams of light thereon. The reduction of error due to the variation in different people of the position of the eyes relative to the top of the head may be reduced to any degree depending merely upon the distance at which the mirror 13 is placed relative to the person's eyes and the tube type of lamp 15.

Examining Fig. 3 the distance from the tube type of lamp to the eye is indicated by letter A while the distance from the mirror to the eyes in Fig. 3 is indicated by the letter B. The reduction of error will be the relation of A to B. Consequently the larger the distance B the smaller the error. If for example the relation of A to B is 1:10 then the error will be reduced 10 times. For example suppose the variation between the eyes of persons and the top of the head of all different people is within two inches. The scale 13' may be graduated to give the mean heights. Therefore the error will be restricted to one inch as far as the position of the eyes is concerned. When the person looks into the mirror 13 his height will be given by reading the point of the scale where the top of the head cuts off the reflection of the tube type of lamp. The error of reading will be reduced a certain amount of any actual variation of the eyes from the top of the head as related to the graduated scale. Therefore if a person having a maximum variation of one inch from the graduated scale obtains his height the error will be a very small portion of an inch which in heights is immaterial.

In Figs. 5–8 inclusive a modified form of the invention has been disclosed in which an automatic height measuring device is shown which comprises opposed casing sections 10 and 11 spaced from each other to allow a person to stand between. These casing sections are mounted upon a base 12 holding the sections in properly spaced positions. The person may stand upon the top of the base 12 when assuming the position between the sections. A mirror 13 is mounted upon one of the sections, as illustrated on section 10. Both of the casing sections are of hollow construction having their opposed faces transparent but closed with window panes 14. The mirror 13 is supported upon the inner rear wall of the casing section 10 so as to be viewable through the window 14.

A tube type of lamp 15 is mounted upon the inner rear face of the window pane 14 of the casing section 11 and extends substantially the entire height of the casing section so that the device is adapted to measure the heights of people varying from 18 to 84 inches. The tube type of lamp 15 is viewable through the window pane 14. A pair of shutter sections comprising a shutter are arranged so as to normally cover the mirror 13 and adapted to move out from the obstructing position upon the operation of the device. This shutter consists of a pair of shutter sections 16 pivotally supported at their outer sides by trunnions 17 so as to be capable of swinging inwards as indicated by the dot and dash lines in Fig. 6. Each of the lower trunnion elements 17 is provided with a pinion 18 meshing with racks 19 connected with cores of solenoids 20 adapted to operate so as to cause opening and closing of the shutters as desired. The details of this operation will be subsequently given. A scale is associated with the mirror 13 to give the height of a person standing between the casing sections when looking into the mirror at the point where the top of the head cuts off the reflected tube type of light 15. The details of this scale will be given in full hereinafter.

Figure 8:
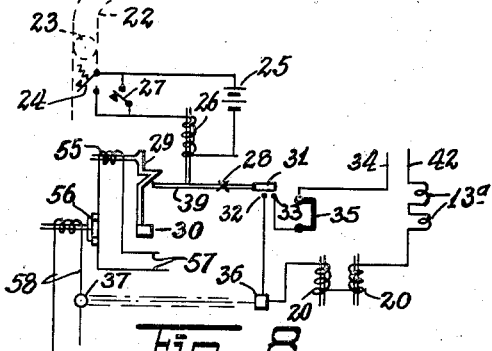
Fig. 8 is a schematic wiring diagram of the device shown in Figs. 5–7 inclusive.

The construction of the electric mechanism of the device may best be understood by examining Fig. 8. The device may be coin controlled or controlled by a switch. If coin controlled a slot 21 for the insertion of a coin is arranged in one of the casing sections and connects with a chute schematically indicated by the dot and dash lines 22 so as to guide the coin 23 to momentarily close the switch 24 during its passage. The switch 24 is in series with a source of power 25 and with a solenoid 26. If it is desired that the device be manually operated instead of coin operated then a switch 27 is arranged which is shunted across the switch 24 and is exposed for operation. The solenoid 26 has its core connected with a lever 39 pivotally mounted intermediately at the point 28. The forward end of this lever is adapted to engage and be held by a catch finger 29 of a resilient nature and mounted upon a fixed support 30. The rear end of the lever 39 is provided with a short circuiting block 31 engageable with contacts 32, 33 to close the operating circuit of the device.

The operating circuit of the device may be traced from the power lead 34 through the tube type of lamp 35 to the contact 33 and then the conductor 31, the contact 32 through a plurality of elements 36 adapted to throw a beam of light from one of the casing members directly across to a plurality of photo-electric cells 37 mounted on the opposite casing member. The circuit continues from the elements 36 through the solenoids 20 connected to operate the shutter sections 16, lamps 13ª to illuminate the scales, and finally the return lead 42.

The mirror and scales are mounted vertically. The scales are graduated to give the height of a person when the person looks into the mirror at the point where the top of the head cuts off the reflection of the tube type of light 15. The resilient finger 29 connects with the core of the solenoid 55 which is in series with the circuit 57 controlled by the relay 56. The primary of the relay 56 is in the circuit 58 which includes the photo-electric cells 37. The relay 56 is of the self opening and coil closing type.

Figure 1:
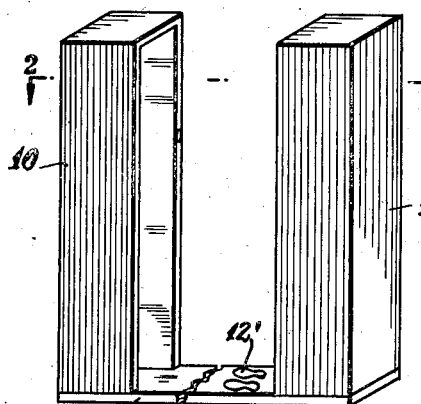
Fig. 1 is a perspective view of a device constructed according to this invention.
Figure 5:
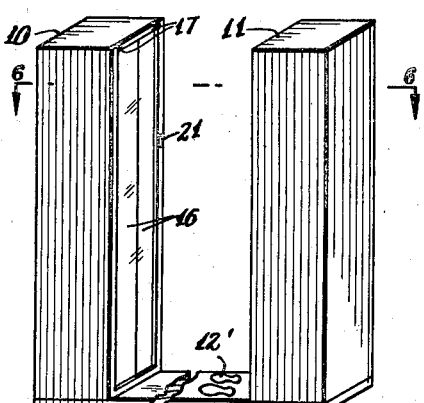
Fig. 5 is a fragmentary perspective view of a device constructed according to a modification of this invention.
Figure 2:
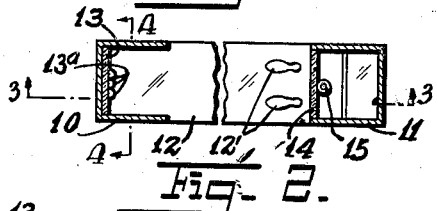
Fig. 2 is a horizontal sectional view taken on the line 2—2 of Fig. 1.
Figure 6:
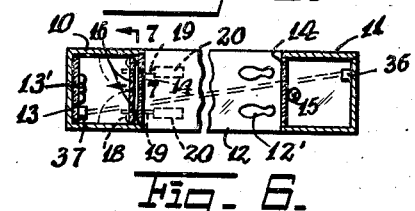
Fig. 6 is a horizontal sectional view taken on the line 6—6 of Fig. 5.

In Fig. 6 the elements 36 are shown mounted upon the casing section 11 and directed to shine beams of light upon the photo-electric cells 37 mounted upon the mirror 13. The path of these beams is such that a person standing between the casing sections will cut off the rays of the beams from striking the photo-electric cells.

The operation of the device is as follows:—A person desiring to be measured steps upon base 12 and faces the casing section 10. Suitable instruction signs should be arranged upon the device to familiarize the person with the necessary steps to operate the device. Then a coin is inserted in the slot 21 or the switch 27 is closed if the device is manually operated. Immediately the electric circuit through the solenoid 26 will be momentarily closed and will pivot the lever 39 so that the free end is caught and held by the resilient finger 29. In the held position, the conductor 31 closes the circuit between the contacts 32 and 33.

When the circuit between the contacts 32 and 33 is closed, the circuit 34, 42 will be in operation and cause the illumination of the tube type of lamp 35, the operation of the elements 36 which throws beams of light, the operation of the solenoids 20 which immediately open the shutters 16 so that the person may view the mirror, and scales and the operation of the lamps 13ᵃ to illuminate the scales, and mirror 13. The person then looks into the mirror at the point where the top of the head cuts off the reflection of the lamp 15 on the illuminated scale and reads his height.

When he moves away from between the casing sections the beam of light from the elements 36 strikes the photo-electric cells 37 and causes operation of the circuit 58 which will operate the relay 56 and energize the solenoid 55 so that the finger 29 is moved to release the lever 38. The lever 39 then moves back to its original position breaking the circuit at the contacts 32 and 33. This will cause the light 35 to be extinguished, will release energization of solenoids 20, and will cause elements 41 to become extinguished. When the beam of light from the elements 36 ceases, the element 37 will operate to cause the circuit 58 to assume its original position in which the relay 56 is open to break the circuit 57 and allow the solenoid 55 to assume its original position in which the resilient finger 28 is in position ready to engage and hold the lever 39 when again moved into an operative position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A height measuring device, comprising opposed casing sections spaced to allow a person to stand in between, a mirror mounted on one of said sections, a tube type of lamp mounted on the other of said sections and opposed to said mirror, and a scale associated with said mirror to give the height of a person standing between the sections and looking into said mirror at the point where the top of the head cuts off the reflection of the tube type of light.

2. A height measuring device, comprising opposed casing sections spaced to allow a person to stand in between, a mirror mounted on one of said sections, a neon lamp mounted on the other of said sections and opposed to said mirror, and a scale associated with said mirror to give the height of a person standing between the sections and looking into said mirror at the point where the top of the head cuts off the reflection of the neon light, said casing sections being hollow, said mirror being within one of the casing sections, said neon lamp being within the other casing section, and transparent panes closing the opposed sides of said casing sections.

3. A height measuring device, comprising opposed casing sections spaced to allow a person to stand in between, a mirror mounted on one of said sections, a mercury vapor lamp mounted on the other of said sections and opposed to said mirror, and a scale associated with said mirror to give the height of a person standing between the sections and looking into said mirror at the point where the top of the head cuts off the reflection of the mercury vapor light, said casing sections being hollow, said mirror being within one of the casing sections, said mercury vapor lamp being within the other casing section, and transparent panes closing the opposed sides of said casing sections shutters being arranged behind the glass panes of the casing section provided with the mirror.

4. A height measuring device, comprising opposed casing sections spaced to allow a person to stand in between, a mirror mounted on one of said sections, a neon lamp mounted on the other of said sections and opposed to said mirror, and a scale associated with said mirror to give the height of a person standing between the sections and looking into said mirror at the point where the top of the head cuts off the reflection of the neon light, said casing sections being hollow, said mirror being within one of the casing sections, said neon lamp being within the other casing section, and transparent panes closing the opposed sides of said casing sections, shutters being arranged behind the glass panes of the casing section provided with the mirror, and means for causing illumination of the neon lamp, and operation of the shutters to move to open position.

5. A height measuring device, comprising opposed casing sections spaced to allow a person to stand in between, a mirror mounted on one of said sections, a neon lamp mounted on the other of said sections and opposed to said mirror, and a scale associated with said mirror to give the height of a person standing between the sections and looking into said mirror at the point where the top of the head cuts off the reflection of the neon light, said casing sections being hollow, said mirror being within one of the casing sections, said neon lamp being within the other casing section, and transparent panes closing the opposed sides of said casing sections, shutters being arranged behind the glass panes of the casing section provided with the mirror, and means for causing illumination of the neon lamp, and operation of the shutters to move to the open position, and also cause operation of an element to cause a beam of light, a photo-electric cell directly opposite the element for producing the beam of light and arranged so as to be intersected by a person standing between said casing sections.

6. A height measuring device, comprising opposed casing sections spaced to allow a person to stand in between, a mirror mounted on one of said sections, a neon lamp mounted on the other of said sections and opposed to said mirror, and a scale associated with said mirror to give the height of a person standing between the sections and looking into said mirror at the point where the top of the head cuts off the reflection of the neon light, said casing sections being hollow, said mirror being within one of the casing sections, said neon lamp being within the other casing section, and transparent panes closing the opposed sides of said casing sections, shutters being arranged behind the glass panes of the casing section provided with the mirror, an element to cause a beam of light and means for causing illumination of the neon tube type of lamp, and operation of the shutters to move to the open position, and also cause operation of said element to cause a beam of light, a photo-electric cell directly opposite the element for producing the beam of light and arranged so as to be intersected by a person standing between said casing sections, means being also provided for automatically causing ceasing of the operation of said device when the beam of light strikes the photo-electric cell as the person steps away from between the casing sections.

7. A height measuring device, comprising opposed casing sections spaced to allow a person to stand in between, a mirror mounted on one of said sections, a tube type of lamp mounted on the other of said sections and opposed to said mirror, and a scale associated with said mirror to give the height of a person standing between the sections and looking into said mirror at the point where the top of the head cuts off the reflection of the tube type of light, whereby a person may stand with the back of the head as close as possible to the tube type of lamp and the mirror and scale be located at a distance from the person so as to reduce errors due to variation of build of different people, to any desired degree.

8. A height measuring device, comprising opposed casing sections spaced to allow a person to stand in between, a mirror mounted on one of said sections, a tube type of lamp mounted on the other of said sections and opposed to said mirror, and a scale associated with said mirror to give the height of a person standing between the sections and looking into said mirror at the point where the top of the head cuts off the reflection of the tube type of light, said opposed casing sections being held separated by a base member, and foot pieces upon the base member to guide the standing of a person between the casing sections.

9. A height measuring device, comprising opposed casing sections spaced to allow a person to stand in between, a mirror mounted on one of said sections, a tube type of lamp mounted on the other of said sections and opposed to said mirror, and a scale associated with said mirror to give the height of a person standing between the sections and looking into said mirror at the point where the top of the head cuts off the reflection of the tube type of light, said opposed casing sections being held separated by a base member, and foot pieces upon the base member to guide the standing of a person between the casing sections, the tube type of lamp being located near to the foot pieces, and the mirror and scale being located far from the foot pieces.

ERLE H. HAND.